US005497977A

United States Patent [19]
Schneider

[11] Patent Number: 5,497,977
[45] Date of Patent: Mar. 12, 1996

[54] PROCESS AND APPARATUS FOR PREHEATING AND INSERTING SCRAP INTO A SMELTING FURNACE

[75] Inventor: Ralf Schneider, Mettmann, Germany

[73] Assignee: Mannesmann Aktiengesellschaft, Düsseldorf, Germany

[21] Appl. No.: 282,915

[22] Filed: Jul. 29, 1994

[30] Foreign Application Priority Data

Jul. 29, 1993 [DE] Germany .................. 43 25 958.8

[51] Int. Cl.$^6$ .................. C21B 7/22; C21C 5/38
[52] U.S. Cl. .................. 266/156; 266/901
[58] Field of Search .................. 266/156, 158, 266/901, 144; 432/9, 199, 180

[56] References Cited

U.S. PATENT DOCUMENTS

| | | | |
|---|---|---|---|
| 4,470,804 | 9/1984 | Geijer et al. ................. | 266/901 |
| 4,775,134 | 10/1988 | Patuzzi et al. ................. | 266/901 |
| 4,812,117 | 3/1989 | Granström ................. | 432/9 |
| 5,000,425 | 3/1991 | Brändström ................. | 266/156 |

*Primary Examiner*—Scott Kastler
*Attorney, Agent, or Firm*—Cohen, Pontani, Lieberman, Pavane

[57] ABSTRACT

The invention is directed to a process and apparatus for preheating and transferring scrap into smelting furnaces for steelmaking or the like. The scrap is preheated by energy contained in the waste gases from the smelting furnace, which energy comprises sensible heat and chemically bonded heat in the combustible portions of the waste gases. The furnace-waste gases are guided to a waste-gas combustion chamber incorporated in a waste-gas outlet line and are burned therein with air to generate hot combustion gases which are fed to the scrap in the receptacles at a preheating station and then sucked out via an exhaust fan. After the scrap reaches the desired temperature, the receptacle containing the preheated scrap is removed from the preheating station so that the preheated scrap may be transferred to the smelting furnace. During this receptacle changeover process, the hot combustion gases are rerouted to another scrap-filled receptacle at the preheating station using a pipeline arrangement.

16 Claims, 6 Drawing Sheets

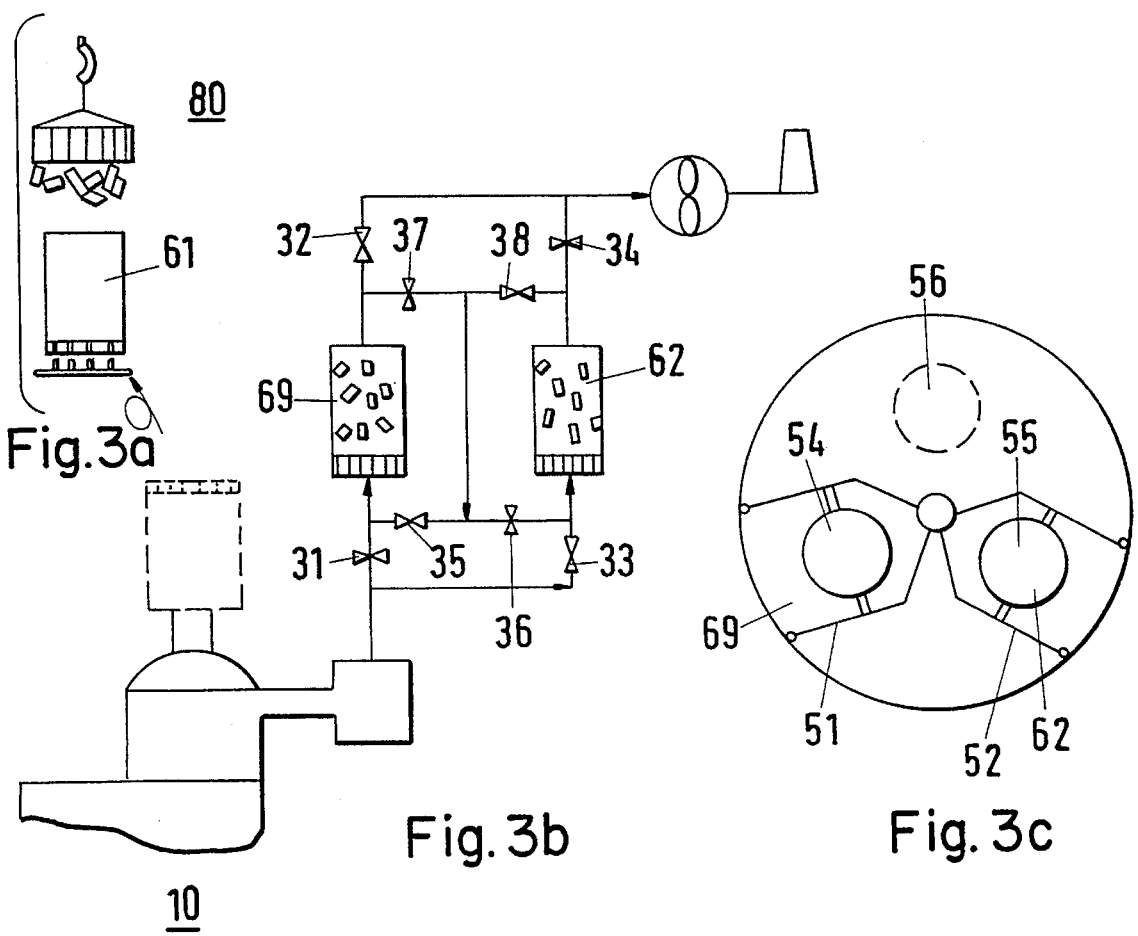

PROCESS AND APPARATUS FOR PREHEATING AND INSERTING SCRAP INTO A SMELTING FURNACE

FIELD OF THE INVENTION

This invention is directed to a process and apparatus for preheating and inserting scrap into a smelting furnace for production of steel or the like, and more particularly, to a process and apparatus by which the scrap may be preheated using energy contained in furnace-waste gases, which energy comprises sensible heat and chemically bonded heat in combustible portions of the furnace-waste gases.

BACKGROUND OF THE INVENTION

In the increasingly competitive steel industry, minimizing the energy consumption of a mill is one of the most important goals. Lowered energy consumption at the mills could mean lower prices for the consumers or higher profit margins for the mill owners or, sometimes, the survival of the business enterprise involved.

Because of the tremendous amount of energy consumed by a mill, savings of a small fraction of the energy used can result in significant monetary gains. An area in which such energy savings may be achieved is in the preheating of scrap metal prior to its insertion into a smelting furnace. By preheating the scrap metal, the smelting furnace requires less energy input to produce the same amount of molten metal.

Various devices and processes have been disclosed for recycling the energy remaining in the furnace-waste gases from a smelting furnace for use in preheating scrap metal. This is typically implemented by combusting the furnace-waste gases and then channeling the hot combustion gas, or heating gas, to a receptacle to preheat the scrap metal contained therein.

In a device for preheating steel scrap disclosed in German patent publication DE-PS 31 33 447, a receptacle that is open at the top and has a base cover which is selectively openable is inserted in a pit. A hood connected to a waste-gas line is fastened to an opening of the receptacle in a gas-tight manner. Hot waste gases are guided into the receptacle from the hood and through the receptacle from top to bottom, thus preheating the scrap contained therein. After the scrap is preheated, the waste gases are guided through an opening provided in the base cover.

In a further development of this concept, German patent publication DE-PS 33 07 400 discloses a preheating apparatus in which hot waste gases are guided axially through a waste gas line from top to bottom through a basket or cage. The basket has solid side walls open at the top and a permeable bottom that is selectively openable. A carriage, or car, is used to transport the basket to the preheating apparatus. The carriage is driven to a position under a raised hood connected to a waste-gas line, and the hood is then lowered until its rim contacts the rim of the basket. The permeable bottom of the basket rests on a mouthpiece located at the carriage and connected to the waste gas line.

Both of these prior art devices employ only one basket connected to a waste-gas line, and the waste gases always flow through the basket from top to bottom. In addition, the hot gas supply to the preheating apparatus is interrupted during each changeover as the basket containing the preheated steel scrap is removed from the preheating apparatus so as to transfer the preheated scrap into the smelting furnace.

An arrangement for preheating scrap having a rotatable platform for two or more scrap baskets is disclosed in German patent publication DE OS 32 43 128. A basket containing preheated scrap is swiveled away from a waste gas line while a new basket is swiveled toward the waste gas line. Gas lines provided with valves or valve systems lead to the scrap baskets. The hot gas can be kept away from or guided away from or guided past the scrap basket or scrap baskets during a changeover by means of the valves or valve systems. The rotating platform and the valves of a duct system for the hot air or hot gas are so constructed that a first basket and a second basket can be heated simultaneously while a third basket location facilitates a changeover. This reference, however, does not disclose the construction of the baskets although it appears, based on the disclosed construction of the installation, that conventional baskets provided with base covers are intended to be used.

A disadvantage of the device disclosed by German patent publication DE-OS 32 43 128 is that it is necessary to guide the gas away from or past the preheating station when changing the baskets.

Another disadvantage of the scrap preheating arrangements disclosed by the above-mentioned prior art is that the hot waste gas is guided from top to bottom of a basket so that some constituents, notably small particles, are also melted along with the steel scrap. These constituents are entrained by the gas flowing downward through the burden column from the top and settle on or near the cooler base of the basket in the form of so-called skull.

OBJECTS OF THE INVENTION

In consideration of the aforementioned disadvantages, the present invention has the primary object of providing, in a cost and energy-efficient manner, a scrap preheating process and a scrap preheating apparatus, in which more than one scrap-filled receptacle can be preheated simultaneously and, during changeover, hot heating gases to a preheated receptacle may be rerouted to another scrap-filled receptacle.

A further object of the invention is to provide an apparatus to facilitate the movement of receptacles into and out of fluid communication with an arrangement of pipelines for preheating scrap.

Yet a further object of the invention is to minimize the amount of light solids entrained and introduced continuously into preheating stations during the operating phase of the smelting furnace.

Still another object of the invention is to provide a receptacle that can withstand the impact of scrap during loading thereof while providing desirable heat transfer and handling characteristics.

SUMMARY OF THE INVENTION

According to the inventive preheating process, furnace waste gases are guided to a waste-gas combustion chamber incorporated in a waste-gas outlet line, and are burned therein with air to generate a hot combustion gas or heating gas. The hot combustion gas is fed to a preheating apparatus and, more particularly, to a plurality of scrap-filled receptacles located at plural preheating stations of the preheating apparatus, and then exits through an outlet.

The combustion gas flows through the scrap-filled receptacles without substantial interruption with respect to time. During a receptacle changeover, a receptacle containing preheated scrap is removed from a preheating station so that the preheated scrap contained therein may be transferred to the smelting furnace. The hot combustion gas to that preheating station is temporarily rerouted so that it flows through those receptacles still remaining at their preheating stations.

At least two receptacles are connected to the hot gas supply. Individual receptacles are preferably connected for serial gas flow, but may also be connected for parallel flow or any combination thereof. The apparatus is configured in such a way that the combustion gas flows through the receptacles from bottom to top.

Scrap is inserted into receptacles that are, preferably, thermally insulated and cylindrically-shaped. The bottom opening of each receptacle is covered by a gram that is preferably formed of heat-resistant material. The openings of the grate are dimensioned so as to prevent scrap from falling through during transportation, while allowing the hot combustion gas to flow through the openings without substantial obstruction. In order to prevent damage to the grate while filling the receptacles with scrap, the grate is preferably set on a baffle plate having a brush-type construction which fills the openings of the grate. The brush-type construction helps absorb the impact forces from the scrap being loaded. The scrap receptacles are transported to the scrap preheating station with the grate facing downward.

According to the invention, the scrap preheating area has a construction which allows individual receptacles to be moved and positioned selectively and independently one from another. Undercarriages are used for guiding individual receptacles into or away from preheating stations along a predetermined path such, for example, as a circular path.

The preheating stations preferably have associated stationary pipelines, for example as supply lines and discharge lines for routing the hot combustion gas into and out of the scrap-filled receptacles. Hoods are disposed at the ports of the gas supply and discharge lines. Gas-tight connections between the gas lines and their corresponding receptacles are achieved by moving the hoods vertically toward their corresponding receptacles and/or moving the receptacles vertically toward the hoods. After establishing fluid communication between the receptacles and the gas lines, the combustion gas is caused to flow from the supply lines, through the receptacles, and out through the discharge lines.

The grate completely fills the bottom opening of a receptacle. The gas flowing against the grate is distributed uniformly outside the grate and flows through the receptacle so as to preheat all of the scrap in the receptacle. The rate of flow is selected so that individual light particles contained in the scrap are not entrained by the gas flowing vertically upward through the receptacle.

In order to empty the scrap receptacles, the receptacles are rotated about their horizontal axis immediately prior to approaching the smelting furnace. In the event the receptacles are outfitted with top covers, the receptacles are transported to a suitable location for proper removal of the top covers prior to charging of the smelting furnace.

The arrangement of the pipeline system and valves permits selective control of the flow of the heating gases; more particularly, a user may select not only serial flow of combustion gas through the scrap receptacles but also parallel flow of the combustion gas. If desired, even a free flow of hot combustion gas may be channeled to appropriate sites of the mill.

There may additionally be provided a measuring and regulating station such, for example, as an electronic sensor-controller communicating with and controlling the various operative parts of the invention, including the valves, undercarriages, hood adjusting mechanism, and exhaust fan.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIGS. 1, 2 and 3 schematically depict a preheating apparatus in accordance with the invention at different flow configurations;

DETAILED DESCRIPTION OF THE PREFERRED EMBODIMENTS

Figures 1A, 1B, 1C:
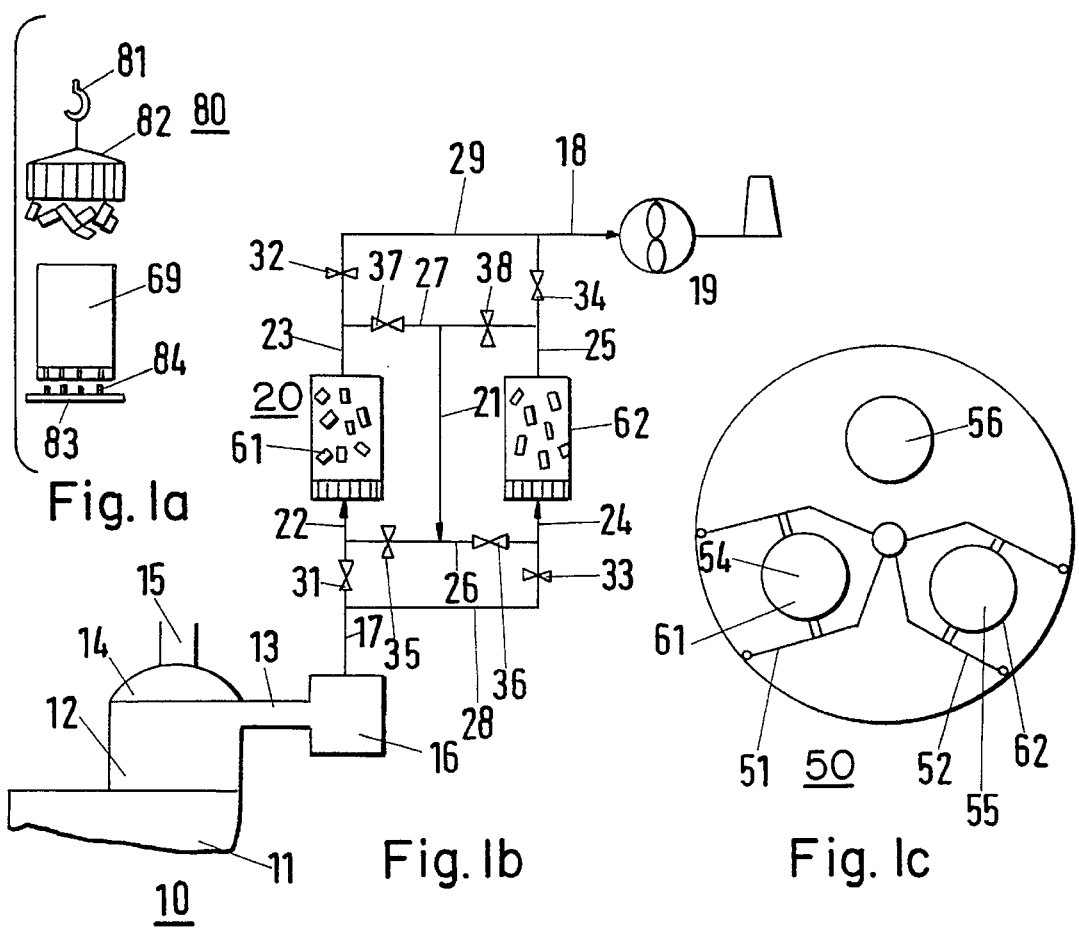
Figures 2A, 2B, 2C:
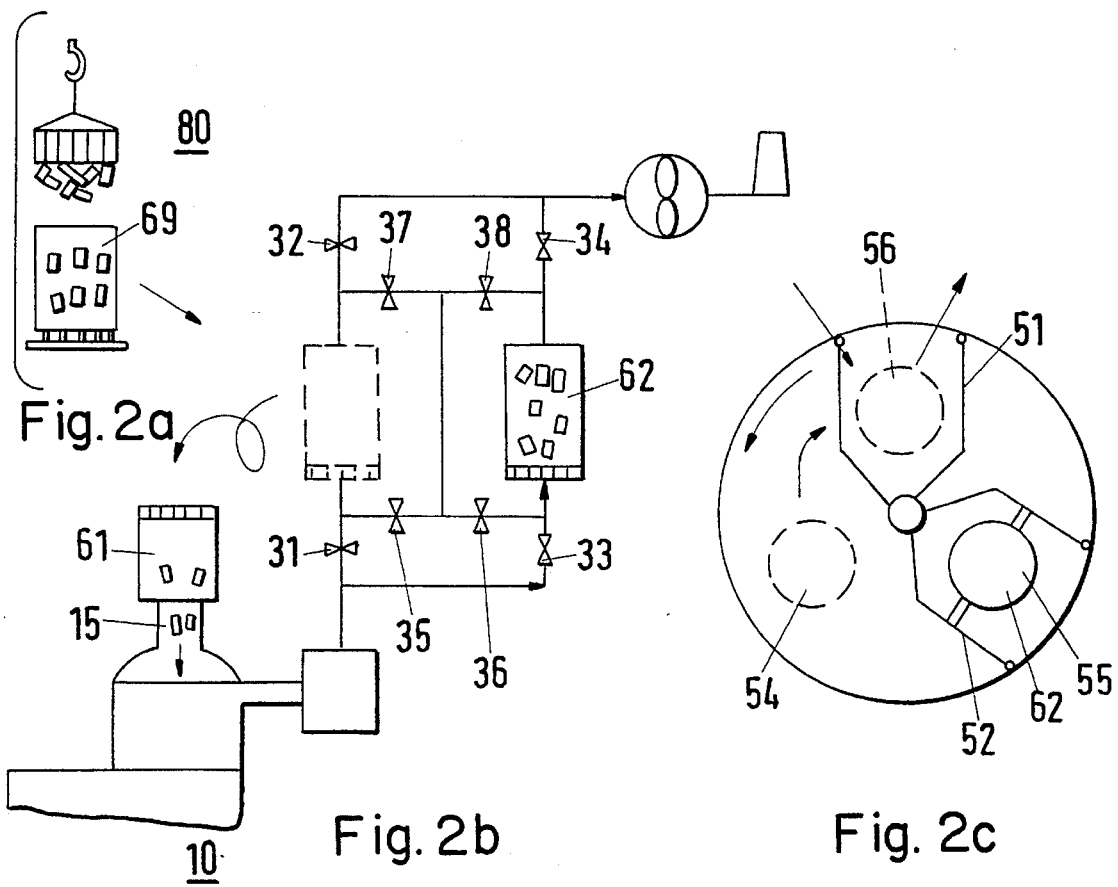

A smelting furnace 10 having a lower vessel 11 and an upper vessel 12 with a cover 14 is shown schematically in FIGS. 1 to 3. The cover 14 has a scrap inlet 15. Further, a waste-gas outlet line 13 communicating with a waste-gas combustion chamber 16 is connected to the upper vessel 12. The waste-gas combustion chamber 16 has an air supply (not shown). Furnace-waste gas is burned in the waste-gas combustion chamber 16 to form a hot combustion gas, or heating gas, which is fed through a gas supply line 17 via a gas pipeline arrangement 20 to a scrap preheating station 50, and is then discharged with or without the aid of an air mover such, for example, as an exhaust fan 19 via a gas discharge line 18. The air mover may be located upstream or downstream from the preheating stations 51, 52.

A preferred embodiment of the gas pipeline arrangement 20 includes the gas inlet lines 22 and 24 which are connected with one another by an inlet connection line 26 and an inlet bypass line 28. In a serial flow configuration, the hot combustion gas is fed to the scrap receptacles 61, 62 through the gas inlet 22 of the preheating station 54, into or upon which a scrap receptacle 61 is located, and through the gas inlet line 24 of the preheating station 55, into or upon which a scrap receptacle 62 is positioned. The gas outputs of the scrap receptacles 61, 62 located at stations 54 and 55 are fed to the gas outlet lines 23, 25 which are themselves connected with one another by an outlet connection line 27 and an outlet bypass line 29. In addition, the inlet connection line 26 and outlet connection line 27 are directly connected with one another by a central pipe 21. An open or free-position station 56 is not connected to any gas inlet or outlet lines, and is used for facilitating a receptacle changeover.

The gas inlet lines 22, 24 have valves 31, 33, respectively, in a region between the inlet connection line 26 and the outlet bypass line 28. The inlet connection line 26 has valves 35, 36 arranged on either side of the connection to the central pipe 21. The outlet lines 23, 25 have valves 32, 34 in a region between the outlet connection line 27 and the outlet bypass line 29. The outlet connection line 27 has valves 37, 38 on either side of the connection to the central pipe 21.

The scrap preheating area 50, as illustrated in FIGS. 1 to 3, has two preheating stations 54, 55 and a free-position station 56. In addition, the scrap preheating area 50 has undercarriages 51, 52 which can selectively guide receptacles 61, 62 to either of the preheating stations 54, 55 or to the free station position 56 along a predetermined path.

A scrap yard 80 is illustrated schematically at the upper left-hand corner of FIGS. 1 to 3. A magnet 82 carried by a hook 81 of a scrap crane may, by way of example, be used for transferring scrap into a receptacle 69.

FIG. 1 illustrates a serial-flow configuration in which the valves 32, 33, 35 and 38 are closed. The hot combustion gas flows through the scrap receptacle 61 via gas inlet line 22. The gas then exits receptacle 61 through gas outlet line 23 and flows through the outlet connection line 27, then through the central pipe 21, inlet connection line 26 and gas inlet line 24, and into the scrap receptacle 62. The combustion gas exits the receptacle 62 and flows into the outlet line 25 and outlet bypass line 29. The gas is discharged via gas discharge line 18, preferably with the aid of an exhaust fan 19 which may be located either upstream or downstream from the preheating stations 54, 55.

In FIG. 2, the valves 32, 35, and 38 are closed while valve 33 is open, and valves 31, 36 and 37 (which were open in FIG. 1) are now closed. FIG. 2 demonstrates that during a changeover the combustion gas may be routed to flow continuously and exclusively through the receptacle 62 positioned at the preheating station 55. During this changeover, the preheating station 54 is open or unused and the receptacle 61 has been moved to the free-position station 56 by the undercarriage 51. From the free-position station 56, receptacle 61 can be removed and transported to scrap inlet 15 for transfer of scrap to the smelting furnace 16. While the receptacle 61 is being unloaded, the scrap receptacle 69 is picked up from the scrap yard 80 and deposited at preheating station 56. The receptacle 61 is then transported by the undercarriage 51 to the preheating station 54.

As may be seen in FIG. 3, the valves 31, 34, 36 and 37 are there closed, while the rest of the valves are open. In this third-disclosed flow configuration, the hot combustion gas flows through the scrap receptacle 62, which was heated during the changeover, and then through the scrap receptacle 69 which has just been moved up from station 56. After delivering its preheated scrap to the smelting furnace 10, the scrap receptacle 61 is transported to the scrap yard 80 with its bottom side facing downward.

Figure 4:
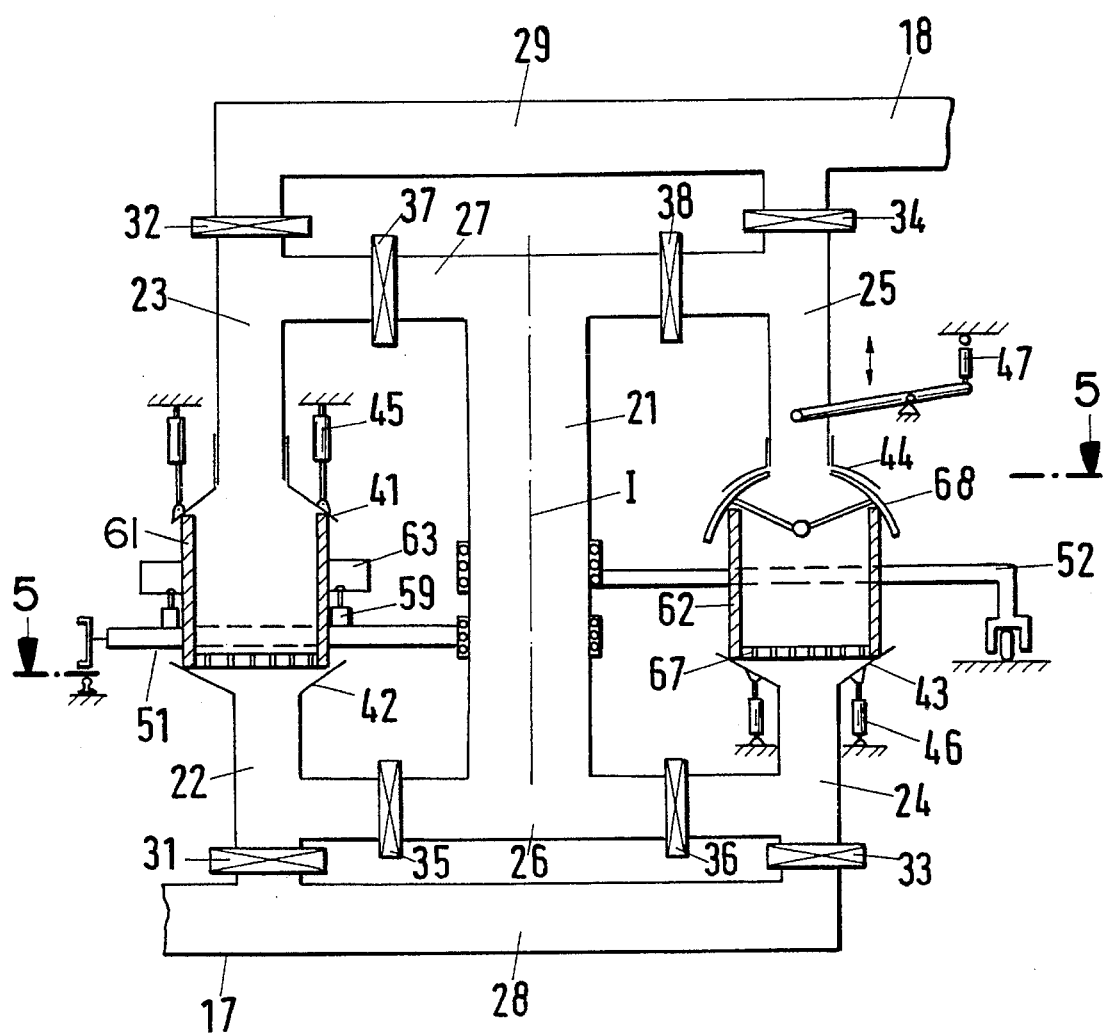
FIGS. 4 and 5 are a cross-sectional view and a top view, respectively, of a preheating area.

In FIG. 4, the valves 31, 32, 33, 34, 35, 36, 37 and 38 between the gas supply line 17 and the gas discharge line 18 are in the same open or shut positions as those depicted in FIG. 1. Like the receptacles in FIG. 1, the receptacles 61, 62 in FIG. 4 are heated serially by the combustion gas. FIG. 4 also shows two different manners of positioning scrap receptacles 61, 62 in the undercarriages 51, 52 relative to the hoods 41, 42, 43, 44. The hoods 41, 42, 43, 44 are disposed at the ports of the inlet and outlet lines 22, 23, 24, 25 and are used for sealing the top and bottom openings of the receptacles so as to establish fluid communication therewith.

As seen on the left-hand side of FIG. 4, a receptacle 61 may be placed on a hood 42 rigidly connected to the gas inlet line 22 so as to establish a gas-tight connection therebetween. The receptacle 61 may be raised and lowered by a lifting device 59 mounted on the undercarriage 51 and acting on supporting pins 63 of the receptacle 61. A movable hood 41 which may be raised and lowered by a hood adjusting mechanism 45 secured at the port of the outlet line 23 facilitates the establishment of a gas-tight connection with the top opening of the receptacle 61.

The right-hand side of FIG. 4 depicts another embodiment in which the scrap receptacle 62 is positioned in the undercarriage 52. The receptacle 62 rests against a hood 43 so as to establish fluid communication therebetween. The hood 43 may be displaced coaxially relative to the gas inlet line 24 using a hood adjusting mechanism 46. The receptacle 62 has a top cover 68 with an adjustable opening. The top cover 68 is selectively opened while the scrap is preheated, and the top cover rests against a hood 44 thereby sealing the region around the opening of the top cover 68. The hood 44 is movable coaxially relative to the outlet 25 using a hood adjustment mechanism 47.

Figure 5:
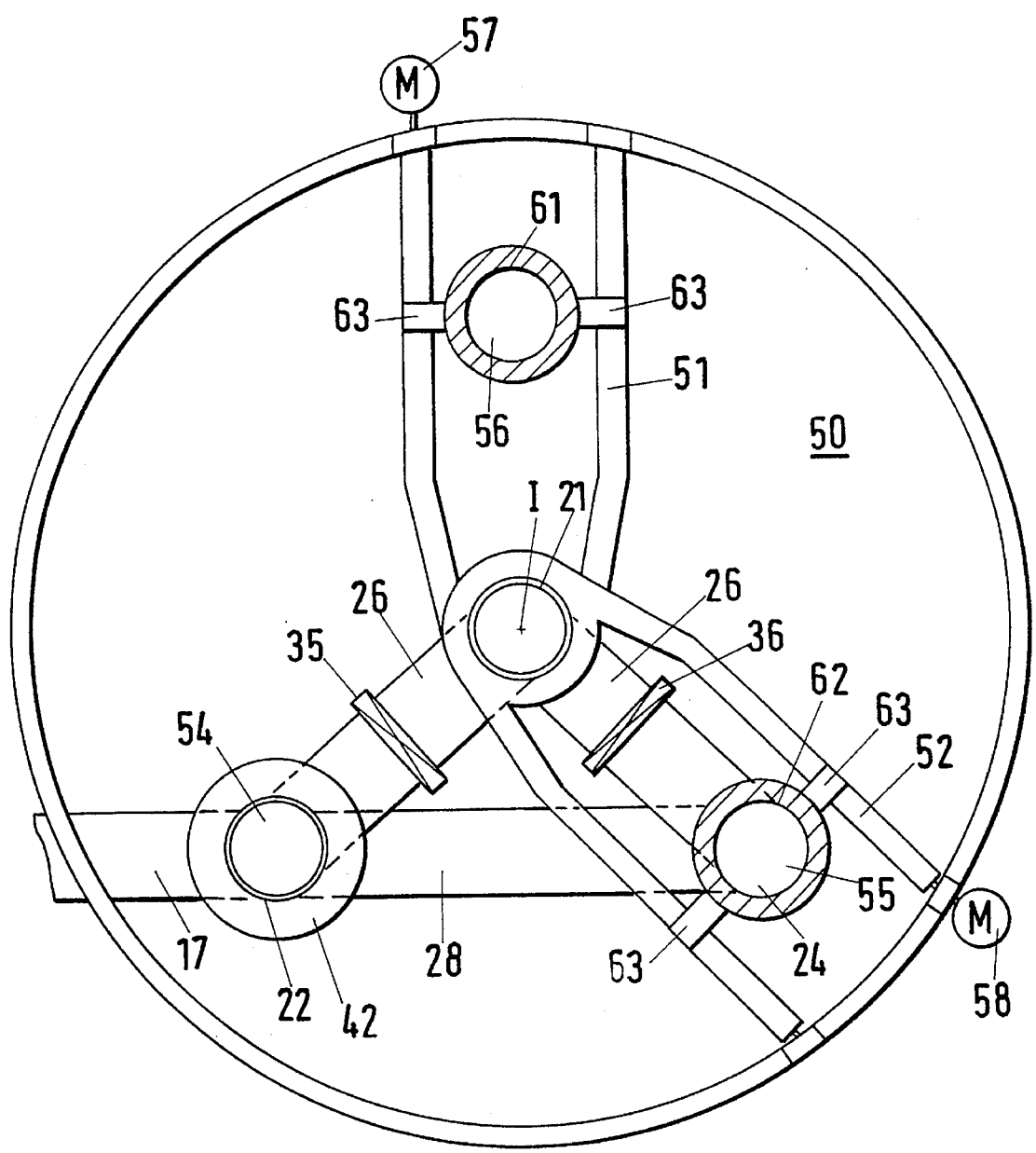

FIG. 5 shows a cross-sectional view through the scrap preheating area 50 along the lines A—A in FIG. 4. Also illustrated is the undercarriage 51 with the scrap receptacle 61 supported thereon through supporting pins 63 located at the free-position station 56. The undercarriage 51 has a carousel-type construction. The undercarriage 51, in the embodiment illustrated in FIG. 5, is rotatably mounted at one end and movably supported on an underlying support surface at another end, so that it may be rotated about the central axis I by a drive 57 such, for example, as a motor. The drawing further depicts the undercarriage 52 with a scrap receptacle 62 supported thereon and located at the preheating station 55. The undercarriage 52 may also be moved by a drive such, for example, as a motor 58. The preheating station 54 is unoccupied in FIG. 5.

Although not shown in the accompanying figures, it is contemplated that a person ordinarily skilled in the art can readily provide a measuring and regulating mechanism such, for example, as an electronic sensor-controller operable so that the various operating parts of the invention, including the valves, undercarriages, hood adjusting mechanism, and exhaust fan, may be full or partially automatically-controlled.

Figure 6:
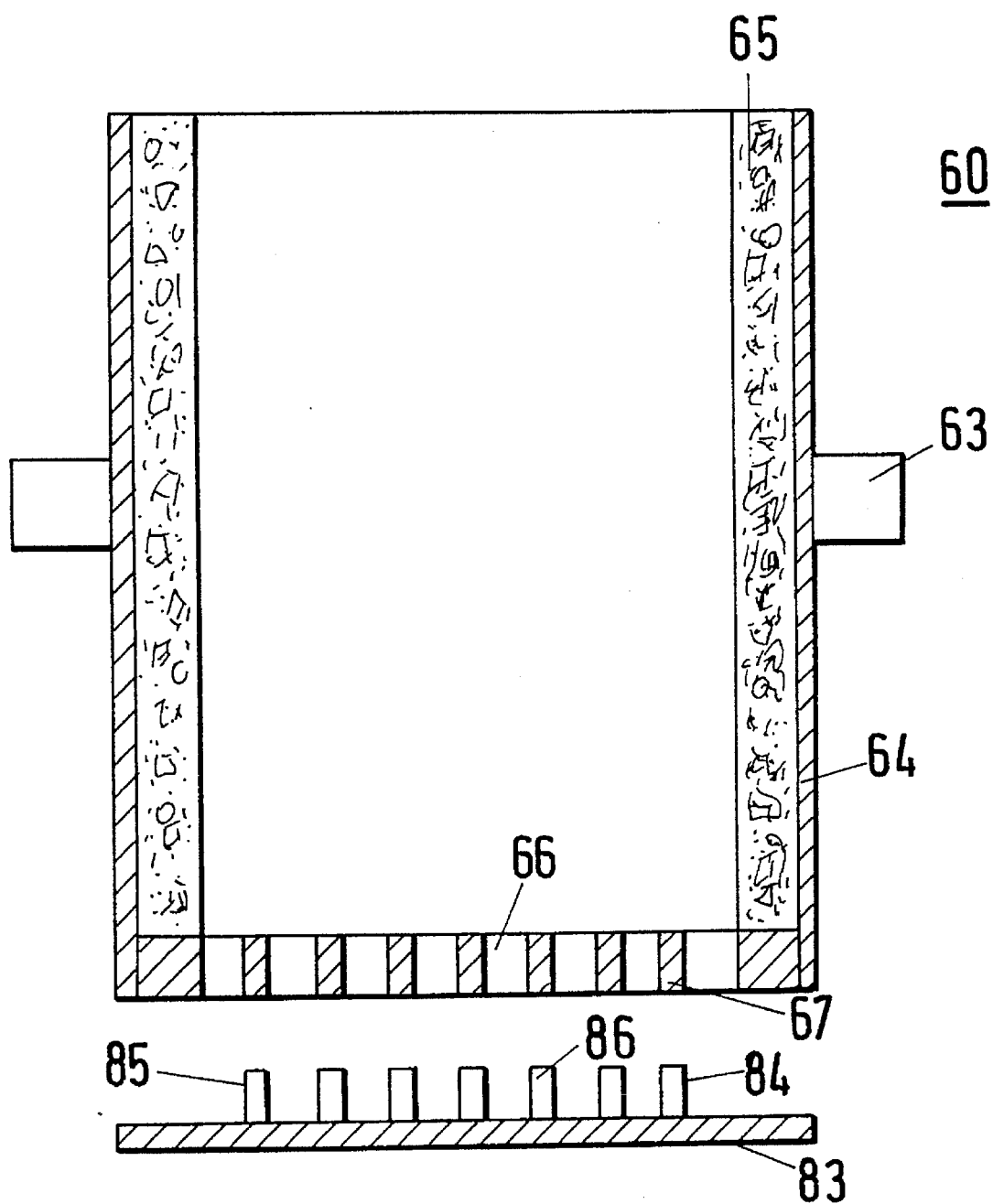
FIG. 6 is a side-sectional view of a scrap receptacle and baffle plate.

FIG. 6 is a side-sectional view through a preferred embodiment of a scrap receptacle 60 having a casing 64, a top opening, and a bottom opening. The receptacle 60 is generally cylindrical in shape and has a thermal insulation 65 disposed on and along the interior surface of the receptacle 60. The casing 64 has supporting pins 63 projecting outwardly from an outer of the casing 64. The bottom opening 66 of the receptacle 60 is covered by a grate 67.

Brush elements 84 disposed on a baffle plate 83 are dimensioned for slidable receipt through the openings of the grate 67. The brush elements 84 may be formed of shock-absorbing material 85 or damping for resilient elements 86 such, for example, as springs. Thus, when the grate 67 of a receptacle is placed on the baffle plate 83, damage to the grate 67 of receptacle 60 can be prevented or at least minimized during loading of scrap.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An apparatus for preheating scrap with a heating gas prior to insertion of the scrap into a smelting furnace, the heating gas comprising combusted waste-gas from the smelting furnace, said apparatus comprising:

a) a plurality of preheating stations, each preheating station being defined by a gas inlet port and a gas outlet port;

b) a free-position station disposed proximate said plurality of preheating stations;

c) a plurality of receptacles selectively positionable at said stations, each of said receptacles being interposable between the gas inlet ports and gas outlet ports of any preheating stations for establishing fluid communication therebetween; and d) a plurality of undercarriages for independently moving said receptacles along a circular path to any of said stations, each of said undercarriages being dimensioned and arranged to receive one of said receptacles.

2. The apparatus as recited in claim 1, further comprising a driving means for selectively moving any of said undercarriages so as to transport said receptacles independently of one another between said plural preheating stations and said free-position station.

3. The apparatus as recited in claim 2, wherein said driving means includes a motor.

4. The apparatus as recited in claim 1, wherein the gas inlet and outlet ports of each preheating station are arranged relative to one another so that heating gas flows substantially upwardly through a receptacle interposed therebetween.

5. The apparatus as recited in claim 1, further comprising connecting means for establishing gas-tight fluid communication between said receptacles and the gas inlet and outlet ports, respectively.

6. The apparatus as recited in claim 5, wherein each of said receptacles has an apertured bottom wall and wherein said connecting means are dimensioned and arranged so that the heating gas is directed across and through a substantial portion of said bottom wall.

7. The apparatus as recited in claim 5, wherein said connecting means includes first and second hoods coaxially displaceable along first and second ends of the gas inlet and outlet ports, respectively.

8. The apparatus as recited in claim 5, further comprising means for selectively positioning said connecting means relative to the gas inlet and outlet ports of each preheating station.

9. The apparatus as recited in claim 1, further comprising:

a) a first plurality of pipelines for supplying heating gas to the gas inlet ports, said first plurality of pipelines comprising:
  i) an inlet connection line in fluid communication with the gas inlet ports; and
  ii) an inlet bypass line in fluid communication with the gas inlet ports;

b) a second plurality of pipelines for receiving heating gas from the gas outlet ports, said second plurality of pipelines comprising:
  i) an outlet connection line in fluid communication with the gas outlet ports; and
  ii) an outlet bypass line in fluid communication with the gas outlet ports; and c) a central pipe establishing fluid communication between said outlet connection line and said inlet connection line.

10. The apparatus as recited in claim 9, further comprising a first plurality of valves operatively associated with said first plurality of pipelines for selectively controlling flow of heating gas entering the gas inlet ports and a second plurality of valves operatively associated with said second plurality of pipelines for selectively controlling flow of heating gas exiting the gas outlet ports.

11. The apparatus as recited in claim 10, wherein said first plurality of valves comprises:

a) a valve disposed in said inlet connection line between said central pipe and the gas inlet port for controlling gas flow into the gas inlet port from said central pipe; and b) a valve disposed in said inlet bypass line and proximate the gas inlet port for controlling gas flow into the gas inlet port from said gas supply line; and wherein said second plurality of valves comprise:

a) a valve disposed in said outlet bypass line for regulating gas flow out of the gas outlet port and into an exit; and b) a valve disposed in said outlet connection line and between the gas outlet port and said central pipe for regulating gas flow out of the gas outlet port and into said central pipe.

12. The apparatus as recited in claim 10, wherein said receptacles are connectable in serial fluid communication with each other.

13. The apparatus as recited in claim 10, wherein said receptacles are connectable in parallel fluid communication with each other.

14. The apparatus as recited in claim 10, further comprising means operatively associated with said second plurality of pipelines and disposed downstream from said receptacles for moving heating gas through said receptacles.

15. The apparatus as recited in claim 10, further comprising means operatively associated with said first plurality of pipelines and disposed upstream from said receptacles for moving heating gas through said receptacles.

16. The apparatus a recited in claim 11, further comprising means for controlling opening and closing of said valves, movement of said undercarriages, and operation of said exhaust means.

* * * * *